Patented Dec. 13, 1938

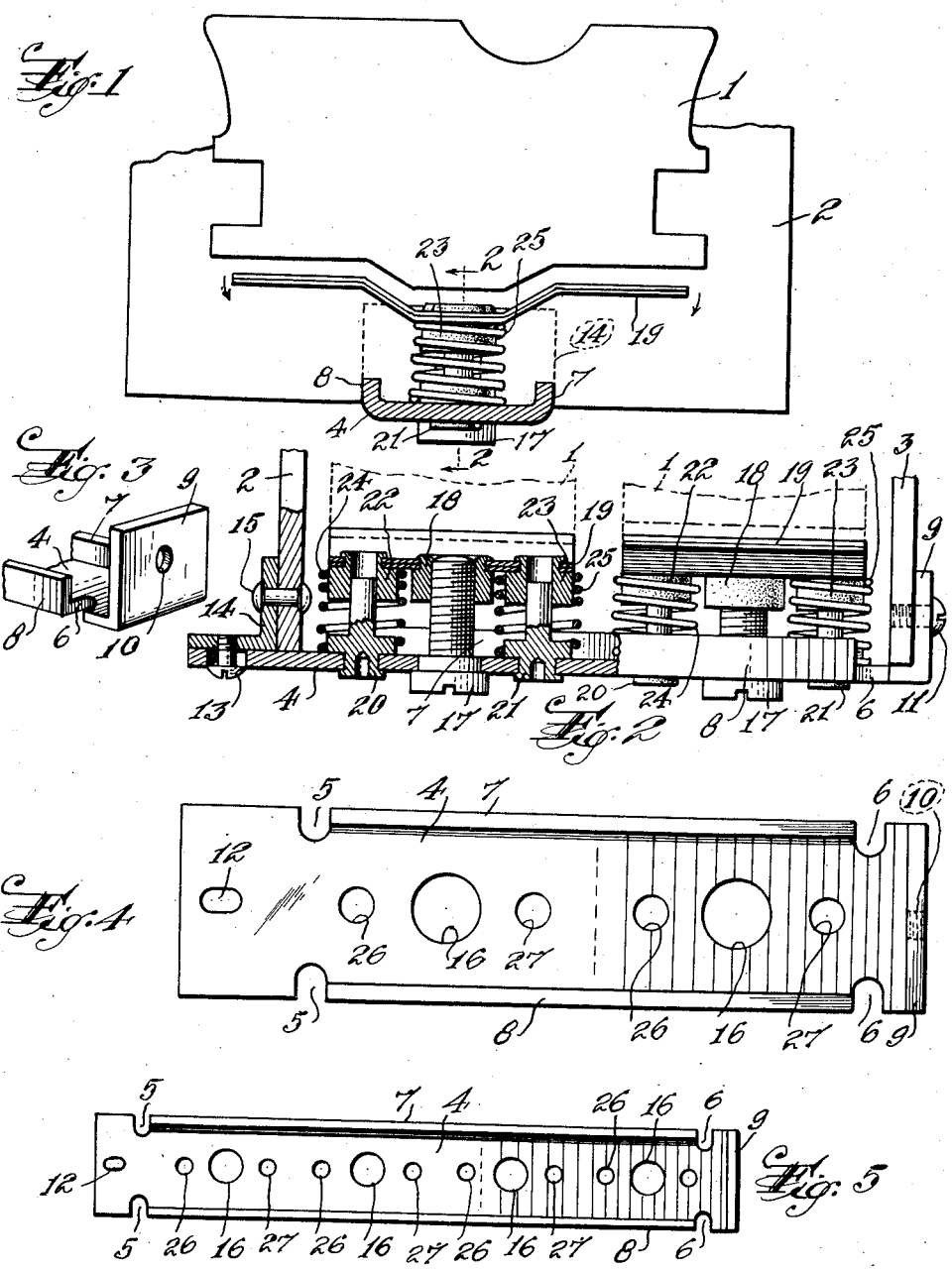

2,140,039

UNITED STATES PATENT OFFICE 2,140,039

CONDENSER TEMPERATURE COMPENSATION MEANS

Melvin V. Weiss, Haddonfield, N. J., assignor to Radio Condenser Company, Camden, N. J.

Application August 10, 1937, Serial No. 158,392

7 Claims. (Cl. 175—41.5)

This invention relates to an electrical condenser such as is used in radio receiving sets.

It frequently happens that such radio receiving sets are subjected to wide variations in temperature, and because of this, it is highly desirable that the component parts making up a tunable circuit, such as the tuning condenser and coil associated therewith, have a very low or zero temperature coefficient. In practice it is impossible to provide a coil and other parts having a zero temperature coefficient, and it is therefore the principal object of my present invention to provide a condenser having a negative temperature coefficient which will automatically balance out the positive coefficient of the other component parts of the circuit, so that the greatest overall frequency stability may be obtained.

My improvement is depicted in the attached drawing, wherein:

Figure 1 is a somewhat schematic view, on an enlarged scale, showing the compensating means associated with the stator elements making up a unit condenser.

Figure 2 is a sectional view on the line 2—2 of Figure 1, of a two-gang condenser.

Figure 3 is a perspective view of one end of a support member carrying the compensating means.

Figure 4 is a plan view of the support plate shown in Figure 2.

Figure 5 is a view on a reduced scale of a support plate such as adapted for use in a four-gang condenser.

In the various views, wherein like numbers refer to corresponding parts, 1 is a plate element of a stator group making up a condenser, the rotor plates and other details not being shown. 2 and 3 are the end plates of the condenser frame. On the bottom portion of the end plates 2 and 3, a support member 4 is attached. The support member 4 has notches 5 and 6 at its opposite ends. Intermediate these notches 5 and 6, the sides 7 and 8 of the support member are bent over to stiffen the support, thereby forming a channel-shaped member. One end 9 is bent over and has one or more holes 10 therein adapted to receive screws 11 for fastening the end of the support to one of the end plates, such as 3.

The opposite end of the support 4 preferably has an oblong hole 12 to receive a screw 13 adapted to screw into the bracket 14 fastened to the end plate 2 in any satisfactory manner as by one or more rivets 15. The reason for the oblong hole 12 is so that the support may be readily attached to the frame of the condenser without applying any strain thereto, or having any strain applied to it through any slight inaccuracies in the manufacture of the frame.

The support 4 is provided with a hole 16 adapted to receive an adjusting screw 17 which is threaded into a bushing 18 riveted to a bimetallic plate 19 composed of two sheets of different kinds of metal, such as ordinarily used in making thermostatic material. Riveted to the plate 4, in the holes 26 and 27, are studs 20 and 21—considering a single-unit condenser—while the opposite ends of these studs are positioned respectively in bushings 22 and 23, likewise riveted or otherwise securely fastened to the thermostatic plate 19.

Associated with each of the studs 20 and 21 and the bushings 22 and 23, are springs 24 and 25 which are under compression between the support 4 and the plate 19. The studs 20 and 21 are used to prevent turning of the plate 19 on the support, as well as to prevent wobble thereof, while the springs 24 and 25 act to hold the plate 19 away from the support 4 and to make the plate follow the adjustment of the screw 17. These springs also act to prevent any vibration of the plate 19.

As will be seen from Figure 1, the plate 19 is positioned longitudinally closely adjacent the bottom edges of the stator element, and is made to generally conform to the shape of these bottom edges, so that the capacity of the condenser may be slightly varied by movement of the plate 19, which is automatically responsive to changes in temperature.

To remove, as far as possible, any changes in the variation of the temperature of the support 4, this is made out of a material having a very low or zero temperature coefficient, such as Invar steel, which is a composition of nickel and iron, wherein the nickel may be of the order of 35%. Likewise, the adjusting screw 17 is made of the same or similar material, and the guide studs 20 and 21 and their cooperative bushings 22 and 23 may also be made of similar material, although it is not absolutely necessary, in all cases, that these particular parts be so constructed.

In the assembly of the thermostatic bi-metallic plate 19, the metal having the higher thermal expansion is placed adjacent the edges of the stator elements so that changes in temperature will cause the plate to bend in the direction of the small arrows, thus lowering the capacity between the stator elements and the plate 19, and hence giving a negative coefficient which, as previously explained, tends to balance out the positive coefficient of the other components in the tunable circuit in which the condenser is used.

It will be obvious that the mechanical details for carrying out my invention may be changed without departing from the spirit thereof or the scope of the appended claims.

What I claim is:

1. Temperature compensation means for an electrical condenser having a frame carrying stator and rotor elements; including a support carried by the frame across the bottom thereof and having a very low temperature coefficient, a plate of thermostatic metal carried by said support but spaced a short distance from said stator elements and overlying a considerable portion of the adjacent edges of the stator element, means for adjusting the position of said plate, said adjusting means being made of a material having a very low temperature coefficient, while the plate itself is capable of automatically changing the capacity of the condenser with changes in temperature.

2. Temperature compensating means for an electrical condenser as set forth in claim 1, further characterized in that said support carries means independent of the adjusting means for preventing turning and wobbling of the thermostatic plate.

3. Temperature compensating means for an electrical condenser as set forth in claim 1, further characterized in that said support carries on opposite sides of said adjusting means, guide pins having ends slidably located in bushings carried by the thermostatic plate for preventing turning and wobbling of the plate.

4. Temperature compensating means for an electrical condenser as set forth in claim 1, further characterized in that said support carries means independent of the adjusting means for preventing turning and wobbling of the thermostatic plate, and further means co-operatively positioned between the support and thermostatic plate and laterally spaced from said adjusting means to prevent vibration thereof.

5. Temperature compensation means for an electrical condenser having a frame carrying stator and rotor elements; including a support carried by the frame across the bottom thereof and having a very low temperature coefficient, a bi-metallic thermo-couple plate carried by said support by means having very low temperature coefficient characteristics so as to overlie in spaced relation a considerable area of the edges of said stator elements, said plate being capable of automatically changing the capacity of the condenser with changes in temperature.

6. Temperature compensating means for an electrical condenser as set forth in claim 5, further characterized in that means are provided for adjusting the position of said plate with respect to the stator elements, and further means independent of the adjusting means for preventing turning and wobble of the plate.

7. Temperature compensation means for an electrical condenser having a frame carrying stator and rotor elements; including a support carried by the frame across the bottom thereof and having a very low temperature coefficient, a bi-metallic plate extending generally longitudinally along the bottom edges of the stator elements, a threaded bushing centrally fastened to said plate, an adjusting screw shouldered on said support and going into the threaded bushing, at least the screw being made of material having a zero or very low temperature coefficient, bushings in the plate spaced, one on each side of said centrally located one, guide studs anchored to said support and having ends fitting in said spaced bushings and a compressed spring located between the support and plate in association with each stud and its bushing for the purposes described.

MELVIN V. WEISS.